United States Patent Office 2,745,746
Patented May 15, 1956

2,745,746

METHOD OF TREATING COCOA BEANS AND PRODUCT THEREOF

Harold E. Jones, Cambridge, Mass.

No Drawing. Application January 19, 1953,
Serial No. 332,097

4 Claims. (Cl. 99—23)

This invention relates to a new process of roasting cocoa beans that produces the only chocolate and cocoa which does not have to be artificially flavored with vanilla and other flavors in order to make chocolate candy, drinks and desserts salable. The invention also relates to the product of this process. This is because the natural chocolate flavor of cocoa beans is so intensified in cocoa beans roasted by my process that the natural chocolate flavor of cocoa beans (which is overridden by the bitterness that develops in cocoa beans due to fermentation in today's chocolate and cocoa) overrides the bitterness in my chocolate and cocoa.

Therefore, chocolate candy, drinks, ice cream and other desserts made with my chocolate or cocoa can have any intensity of natural or true chocolate flavor desired, depending on the amount of chocolate or cocoa used, as the natural chocolate flavor of cocoa beans overrides the bitterness in my chocolate and cocoa; whereas, in order to produce an acceptable taste in chocolate candy, drinks and desserts with today's chocolate or cocoa, no matter how much is used, it is necessary to add vanilla and other flavors to these products because the natural chocolate flavor of cocoa beans is overridden by the bitterness that develops in cocoa beans due to fermentation in today's chocolate and cocoa.

The method or process of this invention may be carried out as follows:

1. The cocoa beans are first placed in a roaster having a closed rotary cylinder and they are given a preliminary roasting operation therein for about twenty minutes in the usual manner.

2. The cocoa beans are then taken from the roaster and the shells removed to leave the cocoa nibs.

3. The partially roasted nibs are then returned to the roaster and an alkalizing solution is poured into the roaster with the nibs and agitation produced by rotating the cylinder is started. This alkalizing solution for each 400 pounds of cocoa nibs is produced by dissolving 8 pounds of a high grade sodium carbonate monohydrate in 36 quarts of hot water.

A particularly satisfactory sodium carbonate monohydrate is manufactured by Imperial Chemicals, Ltd. of London, particularly in small crystalline pellets.

4. The cocoa nibs are allowed to absorb the solution for about 30 minutes, after which heat is applied to the roaster and the final roasting of the nibs started. They are roasted in the usual manner well known to the industry for about 1½ to 2 hours and until about 95% of the moisture has been removed from the nibs.

An experienced operator may easily determine the proper extent of roasting by usual tests.

The time of absorption of the solution by the nibs bebore the heat is applied is rather critical. If it is too short, the solution is not well absorbed. If it is continued for so much as an hour, the product is seriously deteriorated. After the second roasting, as previously described, and the heat is turned off, the nibs are removed from the roaster and after being cooled, are further processed in the usual manner to produce chocolate or cocoa.

Chocolate syrup made from cocoa produced by this process may thereafter be sterilized and packaged without flavor deterioration.

Heretofore the use of alkalizing solution but more concentrated than that used in my process and the addition of other alkalizing solutions have been suggested, and preferably with the addition of sodium potassium tartrate. However, these previous processes have resulted in chocolate and cocoa not nearly as satisfactory for flavor as that produced by the process of this invention, and furthermore a chocolate syrup made from cocoa so processed, particularly when sodium potassium tartrate has been added, cannot be sterilized and packaged without substantial flavor deterioration, so that these prior processes are not commercially valuable.

The natural chocolate flavor in food products in which chocolate or cocoa made by the process of this invention have been incorporated may be enhanced to any desired degree by increasing the amounts of chocolate or cocoa used and without at the same time unduly increasing the sweetness of the product or rendering any bitter flavor more noticeable.

I claim:

1. The method of treating cocoa beans, which comprises effecting a preliminary partial roasting of the beans, removing the shells from the beans to leave the nibs, adding to the nibs an alkalizing solution formed by dissolving 8 pounds of sodium carbonate monohydrate in 36 quarts of water for each 400 pounds of cocoa nibs, allowing the nibs to absorb the solution for approximately a half hour, and then roasting the nibs to the desired extent to drive off approximately 95% of the water.

2. The method of treating cocoa beans, which comprises effecting a preliminary partial roasting of the beans, removing the shells from the beans to leave the nibs, treating the nibs with an alkalizing solution formed by dissolving 8 pounds of sodium carbonate monohydrate in 36 quarts of water for each 400 pounds of cocoa nibs, agitating the mixture for approximately one half hour, and then completing the roasting of the nibs to the desired extent to drive off approximately 95% of the water.

3. Cocoa and chocolate made by the process of claim 1.

4. Cocoa and chocolate made by the process of claim 2.

References Cited in the file of this patent

UNITED STATES PATENTS 737,432    Meinl _____ Aug. 25, 1903

OTHER REFERENCES

"The Cocoa and Chocolate Industry" by Arthur W. Knapp, text published by Sir Isaac Pitman and Sons Ltd., pages 118, 120, New York, New York.